United States Patent [19]
Chraplyvy et al.

[11] Patent Number: 5,587,830
[45] Date of Patent: Dec. 24, 1996

[54] HIGH CAPACITY OPTICAL FIBER NETWORK

[75] Inventors: Andrew R. Chraplyvy; Robert W. Tkach, both of Monmouth County, N.J.

[73] Assignee: Lucent Technologies Inc., Murray Hill, N.J.

[21] Appl. No.: 69,952

[22] Filed: May 28, 1993

[51] Int. Cl.$^6$ .............................. H04B 10/12; G02B 6/10; G02B 6/28
[52] U.S. Cl. ..................... 359/341; 359/161; 359/337; 385/123
[58] Field of Search .................................. 359/161, 173, 359/174, 337, 341; 385/3, 123

[56] References Cited

U.S. PATENT DOCUMENTS

| | | | |
|---|---|---|---|
| 4,261,639 | 4/1981 | Kogelnid et al. | 359/161 |
| 4,969,710 | 11/1990 | Tick et al. | 359/174 |
| 5,191,631 | 3/1993 | Rosenberg | 385/123 |
| 5,218,662 | 6/1993 | Dugan | 385/123 |
| 5,224,183 | 6/1993 | Dugan | 385/24 |
| 5,225,922 | 7/1993 | Chraplyvy et al. | 359/124 |
| 5,261,016 | 11/1993 | Poole | 385/28 |
| 5,274,733 | 12/1993 | Prigent et al. | 385/123 |
| 5,343,322 | 8/1994 | Pirio et al. | 359/132 |
| 5,355,240 | 10/1994 | Prigent et al. | 359/161 |
| 5,361,319 | 11/1994 | Antos et al. | 385/123 |

FOREIGN PATENT DOCUMENTS

| | | | |
|---|---|---|---|
| 0531210 | 9/1992 | European Pat. Off. | H04B 10/18 |
| 0532388 | 9/1992 | European Pat. Off. | H04B 10/18 |
| 2681745 | 9/1991 | France | H04B 10/00 |

OTHER PUBLICATIONS

Cottingham, C. F., "Dispersion–shifted Fiber", *Lightwave*, pp. 25–29, Nov. 1992.

Marcuse, D., "Single–Channel Operation in Very Long Nonlinear Fibers with Optical Amplifiers at Zero Disperstion", *J. Lightwave Technology*, vol. 9, No. 3, pp. 356–361, Mar. 1991.

Marcuse, D., et al., "Effect of Fiber Nonlinearity on Long–Distance Transmission", *J. Lightwave Technology*, vol. 9, No. 1, pp. 121–128, Jan. 1991.

Reed, W. A., et al., "Tailoring Optical Characteristics of Dispersion–Shifted Lightguides for Applications near 1.55µm", *AT&T Technical Journal*, vol. 65, Issue 5, (1986), pp. 105–122.

Bahsoun, S. M., et al., "WDM Applications for Optically Amplified Systems", Fiber Laser Sources and Amplifiers IV, *SPIE*, vol. 1789, pp. 260–267 (1992).

D. Marcuse, "Single–Channel Operation in Very Long Nonlinear Fibers with Optical Amplifiers at Zero Dispersion", *J. Lightwave Tech.* vol. 9, No. 3, Mar. 1991.

D. Marcuse, et al., "Effect of Fiber Nonlinearity on Long–Distance Transmission", *J. Lightwave Tech.* vol. 9, No. 1, Jan. 1991.

Chaplyvy et al, Sch of Electron Eng. & Comput. Syst., Proc. SPIE–Int. Soc. Opt Eng., vol. 1974, pp. 170–176, Apr. 8, 1993 Abstract only herewith.

Chaplyvy, A., Journ. Lightwave tech., vol. 8, #10, Oct. 1990, pp. 1548–1557; abst. only herewith.

Chaplyvy, A., Opt. Fiber Commun. Conf., 1988, tech. Dig. Ser. vol. 1, Jan. 25, 1988; abst. only herewith.

Mollenouer et al, J. Lightwave Technol., vol. 9, #3, pp. 362–367, Mar. 1991; abst. only herewith.

*Primary Examiner*—Nelson Mosokowitz

[57] ABSTRACT

A high capacity optical fiber network operative with wavelength division multiplexing. Contemplated systems can utilize span distances in excess of 100 km, signal amplification within spans, and provide plural multiplexed channels operative at multiple gigabits per second.

10 Claims, 4 Drawing Sheets

HIGH CAPACITY OPTICAL FIBER NETWORK

BACKGROUND OF THE INVENTION

1. Technical Field

The field addressed concerns high capacity optical fiber networks operative with wavelength division multiplexing. Systems contemplated: are based on span distances which exceed 100 kilometers; depend upon signal amplification rather than repeaters within spans, and use three or more multiplexed channels each operative at a minimum of 5.0 gbits per second.

2. Description of the Prior Art

The state of the art against which the present invention is considered is summarized in the excellent article, "Dispersion-shifted Fiber", *Lightwave*, pp. 25–29, Nov. 1992. As noted in that article, most advanced optical fiber systems now being installed and in the planning stages depend upon dispersion-shifted fiber (DS fiber). A number of developments have led to a preference for a carrier wavelength at 1.55 μm. The loss minimum for the prevalent single-mode silica-based fiber is at this wavelength and the only practical fiber amplifier at this time—the erbium amplifier operates best at this wavelength. It has been known for some time that the linear dispersion null point—the radiation wavelength at which the chromatic dispersion changes sign and passes through zero—naturally falls at about 1.31 μm for silica-based fiber. DS fiber—fiber in which the dispersion null point is shifted to 1.55 μm—depends upon balancing the two major components of chromatic dispersion; material dispersion and waveguide dispersion. Waveguide dispersion is adjusted by tailoring the fiber's index-of-refraction profile.

Use of DS fiber is expected to contribute to multi-channel operation—to wavelength division multiplex (WDM). Here, multiple closely spaced carrier wavelengths define individual channels, each operating at high capacity—at 5.0 gbit/sec or higher. Installation intended for WDM either initially or for contemplated upgrading uses three or more channel operation, each operating sufficiently close to the zero dispersion point and each at the same capacity. Contemplated systems are generally based on four or eight WDM channels each operating at or upgradable to that capacity.

WDM systems use optical amplification rather than signal regeneration where possible. WDM becomes practical upon substitution of the optical amplifier for the usual repeater which depends upon electronic detection and optical regeneration. Use of the Er amplifier permits fiber spans of hundreds of kilometers between repeaters or terminals. A system in the planning stage uses optical amplifiers at 120 km spacing over a span length of 360 km.

The referenced article goes on to describe use of narrow spectral line widths available from the distributed feedback (DFB) laser for highest capacity long distance systems. The relatively inexpensive, readily available Fabry Perot laser is sufficient for usual initial operation. As reported in that article, systems being installed by Telefonos de Mexico; by MCI; and by AT&T are based on DS fiber.

A number of studies consider non-linear effects. (See, "Single-Channel Operation in Very Long Nonlinear Fibers With Optical Amplifiers at Zero Dispersion" by D. Marcuse, *J. Lightwave Technology*, vol. 9, No. 3, pp. 356–361, March 1991, and "Effect of Fiber Nonlinearity on Long-Distance Transmission" by D. Marcuse, A. R. Chraplyvy and R. W. Tkach, *J. Lightwave Technology*, vol. 9 No. 1, pp. 121–128, January 1991.) Non-linear effects studied include: Stimulated Brillouin Scattering; Self-Phase and Cross-Phase Modulation; Four-Photon Mixing (4 PM); and Stimulated Raman Scattering. It has been known for some time that correction of the linear dispersion problem is not the ultimate solution. At least in principle, still more sophisticated systems operating over greater lengths and at higher capacities would eventually require consideration of non-linear effects as well.

TERMINOLOGY

WDM—Wavelength Division Multiplex, providing for multi-channel operation within a single fiber. Channels are sufficiently close to be simultaneously amplified by a single optical amplifier. At this time, the prevalent optical amplifier (the erbium-doped silica fiber amplifier) has a usable bandwidth of $\Delta\lambda \cong 10$–20 nm.

Dispersion—When used alone, the term refers to chromatic dispersion—a linear effect due to wavelength dependent velocity within the carrier spectrum.

Span—Reference is made here to a repeaterless fiber length. This length which likely includes optical amplifiers is the distance between stations at which the signal has been converted from or is converted to electronic form (commonly the distance between nearest signal regenerators). This span may define an entire system, or may be combined with one or more additional spans.

SUMMARY OF THE INVENTION

In most relevant terms, new installations for initial or contemplated WDM optical fiber communications systems require fiber having a minimal dispersion over substantially the entirety of a communications span—prohibit use of any substantial length of DS fiber. Spans may be made up of uniform fiber of constant dispersion desirably at a value of at least 1.5 ps/nm-km. Alternatively, spans may use series of fiber of different dispersion by: "Concatenation" or "Compensation". Both include fiber of dispersion larger than 1.5 ps/nm-km. Concatenation uses successive fiber lengths of positive and negative dispersion generally of the same order of magnitude. Compensation uses relatively short lengths of "dispersion matching" fiber of very large dispersion to compensate for major fiber lengths of opposite sign of dispersion. While near-future WDM system use is tolerant of a small prescribed average amount of chromatic dispersion, contemplated systems permit averaging to $\lambda_0 = 1550$ nm. There is some preference for maintaining dispersion below some maximum value for any given length of fiber in the system. Particularly for systems of total capacity greater than 40 gbit/sec four-channel or 80 gbit/sec eight-channel, spontaneous generation to increase spectral content beyond that introduced by the carrier-generating laser, may result in capacity-limiting dispersion. Since resulting chromatic dispersion is effectively non-linear, the initial pulse content is no longer retrievable. For these purposes, a maximum dispersion value of 8 ps/nm-km may be prescribed for more sophisticated systems of the future.

Enhanced signal capacity is due to fiber-path design which avoids four-photon mixing as the capacity limitation. This consideration is determining for: four or more channel systems with spacings of 2.5 nm or less; for span lengths at least equal to 300 km; permitting amplifier spacings of at least 100 km. The invention is defined accordingly.

Co-filed U.S. Pat. No. 5,327,516, issued Jul. 5, 1994, claims a fiber of profile assuring a small but critical chromatic dispersion suitable for use in WDM systems. Its use is contemplated in a species of this invention.

In its broadest terms, the invention reflects the observation that four-photon mixing is a relevant mechanism which must be considered in the design of contemplated WDM systems. A number of factors lend assurance to the assumption that the inventive teaching will take the form described above. For one thing, changing the carrier wavelength, e.g. to $\lambda=1550\pm20$ nm, for introducing requisite dispersion into DS fiber, while in principle appropriate, is not easily achievable. The erbium amplifier at its present advanced state of development, has an operating peak near 1550 nm. Operation 20 nm off this peak reduces the carrier power level to an inconveniently low magnitude for one or more of the channels. It is conceivable that substitution for erbium or that some other change in design of the amplifier will permit this operation. It is more likely that future systems will continue to be designed taking advantage of the present or some more advanced stage of the conventional erbium amplifier.

Four-photon mixing depends upon the precise wavelengths of generated carriers. Evenly spaced, four-channel systems unavoidably satisfy this requirement. The likely significance of 4 PM is somewhat reduced for a three-channel system, and precise uneven spacing even in a four-channel system may, in principle, avoid it as well. Problems in taking this approach require operating parameters which may be beyond the present state of the art, and, which in any event, would introduce some further expense. Reliable stabilization to maintain such precision, e.g. as due to thermal drift, is problematic.

These alternative approaches may not be seriously considered for newly installed systems, but may be of value for upgrading of inground systems—particularly, those with DS fiber in place.

DETAILED DESCRIPTION

General

Figure 1:
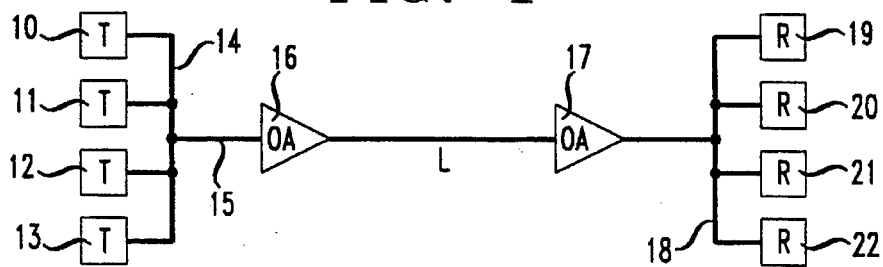
FIG. 1 is a schematic diagram of a WDM system which serves for discussion of the various inventive species.

It has now been found that the ultimate purpose to be served by DSF is thwarted by the very perfection with which chromatic dispersion is eliminated. The permitted dispersion tolerance, of <3.5 ps/nm-km over the wavelength range $\lambda=1525-1575$ nm, of the DSF Specification Table is, in itself, assurance of sufficient non-linearity to cause difficulty in WDM operation, even in near-term systems. It is now found that planned systems are incapable of operation due to a form of non-linearity. The limiting non-linearity—four-photon mixing (4 PM)—has been known for some time and is described in the literature, see, article entitled "Effect of Fiber Nonlinearity on Long-Distance Transmission", cited above. For most purposes 4 PM has been considered of academic interest only. The cited paper is reasonably representative in examining systems of span lengths of 7500 km. In-place systems (based on usual span lengths, which are much shorter), as well as continued sale and installation of DSF specifically for WDM operation is consistent with this view.

It is possible to lessen limitations imposed by 4 PM by sophisticated circuit design. Attention to channel spacings and modulation formats may permit continued use of DSF for WDM systems of severely reduced capability—for limited numbers of channels and for limited distances. WDM systems now contemplated, are not permitted, but become possible by practicing the invention. Replacement of DSF will permit sought-for capability of e.g., four-channel operation, per channel capacity of at least 5 Gb/sec; repeaterless span lengths of 360 km and more, and channel spacings of 1.0 nm–2.0 nm. System designers will readily acknowledge and implement the teaching.

As elsewhere in this description, specific magnitudes may be illustrative, or may designed to satisfy near-term practical goals. As an example, channel spacings of 1.0 nm or greater take account of readily attainable frequency stabilization of transmitters and receivers. Closer spacing with its greater permitted system capacity, taking advantage of the reduction in 4 PM of the invention, may be justified. Design considerations have led to postulated spacings at 0.8 nm.

The teaching depends on background knowledge of the skilled reader. To be rigorous, 4 PM appears as a fluctuating gain or loss—as a power penalty—due to constructive and destructive interference entailing signals of different channels. 4 PM is not a noise source. Since the effect is a signal distortion, with amplitude of some portions increased and some decreased, the effect may not later be redressed. Since the magnitude of 4 PM is power dependent, the effect may be lessened by reducing launch power. For a given fiber span length, insertion loss may be lessened, by the approach of increasing the number of amplifiers to permit a decrease in launched powers. As defined under "Terminology", WDMF permits use of amplifiers, each operating at a power level precluded by DSF for contemplated WDM. For these purposes, the inventive advance is defined in terms of amplifier spacings of 120 km or more with one or more amplifiers operating at a launch power level of 2.5 mw/Gb-sec.

These considerations are in terms of an expected loss budget including splice losses, aging effects, etc., of 33 dB for the interamplifier spacing. Other considerations may suggest otherwise. As an explicit example, undersea systems may use substantially greater span lengths than contemplated for terrestrial use due to greater installation and maintenance costs of regenerator equipment. This in turn leads to closer amplifier spacings—to spacings $\leq 100$ km.

Systems of the invention satisfy high level expectations of the system designer—expectations now shown to be precluded with DSF.

FIG. 1 shows a characteristic WDM system as contemplated for installation in the near future. It consists of four transmitters, 10, 11, 12, and 13, combined in a passive 4:1 coupler 14. The combined signal is introduced into fiber transmission line 15 which is provided with two optical amplifiers 16 and 17. At the receiver end, the four-channel signals are split by demultiplexer 18 after which the separated signals are routed to the four regenerators 19, 20, 21 and 22.

FIG. 1 is representative of systems of the invention which may include a greater number of channels—8-channel systems are now contemplated. Longer systems may include longer spans or multiple spans so that the four transmitters may serve for regeneration. For one system in the planning stage, span length is 360 km and amplifier spacing is 120 km. Channel spacing, the difference in carrier wavelength is 200 GHz (or about 1.5 nm). A fiber path may, as discussed, consist largely of unchanging fixed dispersion fiber end-to-end, or may be made up of concatenated or compensated fiber.

WDM systems claimed differ from those presently planned primarily in the nature of the fiber transmission line. Previous systems were designed on the premise that chromatic dispersion is the controlling factor on capacity. It was expected that use of dispersion shifted fiber would permit the WDM objective—initially span length of 360 km, four-channel, with per channel capacity of 5 gbit/sec. The thrust of the invention is that a form of non-linear dispersion, four-photon mixing (4 PM), prevents attainment of the four-channel 20 gbit/sec capacity objective. The immediate result is to preclude use of any substantial length of DS fiber. It is expected that newly-installed systems will now use dispersive fiber. Any chromatic dispersion limit imposed will be offset by concatenation or compensation.

The two approaches permit use of fiber having substantial values of dispersion—permit use of fiber of dispersion greater than 4 ps/nm-km and more as measured at $\lambda=1550$ nm. Both require precisely prescribed fiber lengths to exactly compensate and reduce dispersion to a suitable level. The first, concatenation, uses successive lengths of "normal" dispersive fiber of opposite sign of dispersion. By "normal" is meant fibers of dispersion at or below that introduced by the material dispersion of the system—for fiber now in use, at or below ~18 ps/nm-km. The approach is taken seriously for underwater installations, but has generally been disregarded for terrestrial use. It does require precise length determinations for each type of fiber before installation. The second, compensation, uses relatively short lengths of high dispersion fiber, to compensate for the normal fiber. It is expected that compensation fiber will be put on reels to be installed at amplifier or terminal points.

FIGS. 2–5

The "eye" diagrams of these figures trace channel power as a function of time.

The diagrams are generated by plotting the received signal as a function of time, and then shifting the time axis by one bit interval and plotting again. The abscissa interval is about 1 bit long. The 64 now-superimposed bits define most probable (constructive and destructive) interference events due to transmission in the three channels adjoining the particular channel plotted. The eye diagram depicts the worst case impairment as measured by the greatest ordinate value clear of traces (by the vertical dimension of the clear space between a peak and null). A system which is not excessively impaired shows clear discrimination between "ones" and "zeros" with a large "eye opening" in the center of the diagram. An unimpaired system is considered to have an "eye opening" of 1.0. Real systems which operate at openings of ~0.9, are considered substantially unimpaired. Systems are designed for such openings, so that substantially greater impairment calls for costly design modification—in the instance of WDM—by decreasing amplifier/ compensation distances and/or by reducing amplifier launch power.

Diagrams show a 64-bit pattern and include effects of both (linear) dispersion and those arising from non-linear index of refraction. For consistency, all curves are for the 3rd channel Responsible factors are primarily chromatic dispersion, 4 PM, and SPM. Operating power levels are sufficiently low that other non-linear effects may be ignored. (Non-linear effects at a very low level are: Stimulated Brillouin Scattering, and Stimulated Raman Scattering). Spurious lines are responsive to all probable interactions. The significance of the diagram is in the "opening of the eye"—in the fraction uninhabited space between a peak and a null.

Figure 2:
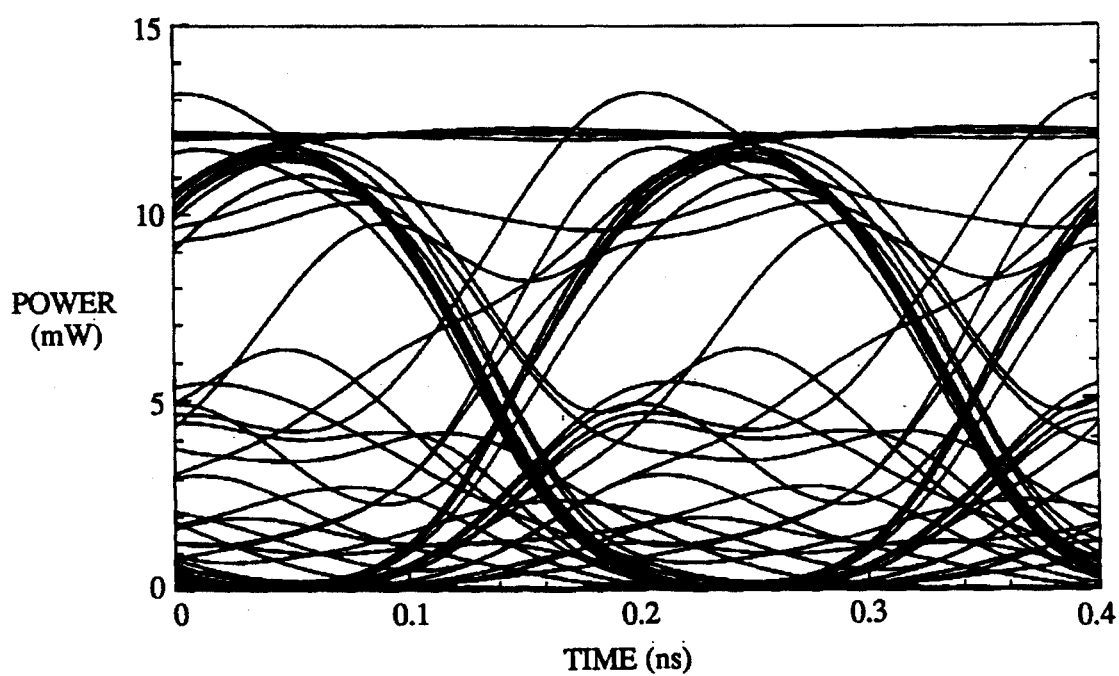
FIGS. 2–5 are "eye" diagrams which, as plotted on coordinates of power and time, show the contrast between ones and zeros in the bit stream as due to the various forms of dispersion including linear dispersion and 4 PM for a four-channel system. The basic operating system characteristics for all of these figures are the same. They differ in the characteristics of the fiber.

FIG. 2 is the eye diagram for a DSF four-channel WDM system operating with: 200 GHz (1.5 nm) channel spacing; 360 km span length; 120 km amplifier spacing; and operating at 5 Gb/sec per-channel capacity. Its opening of ~0.560 is inadequate for operation. Since non-dispersive, dispersion and SPM may be ignored so that eye closing is entirely due to 4 PM.

Figure 3:
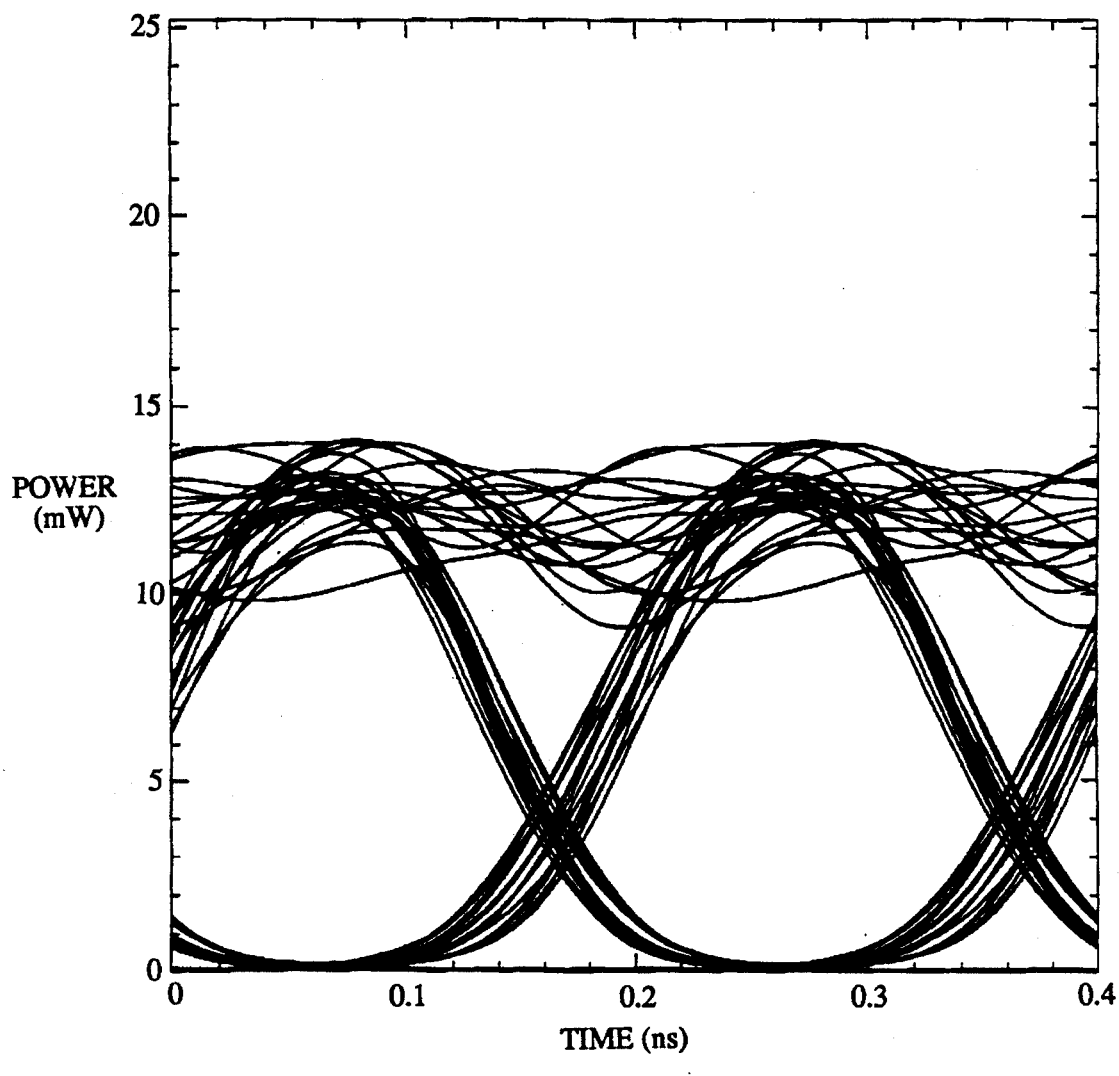

FIG. 3 is the eye diagram for a WDMF system operating under the same conditions. Its eye opening of ~0.814 is sufficient contrast for operation. The system of this figure is not compensated for its dispersion of +2 ps/nm-km. Use of compensating fiber to reduce its dispersion will further improve operation, which, although not needed under these conditions, will permit increased capacity.

FIG. 4, again for the same WDM system, shows the use of fiber of a dispersion of +16 ps/nm-km. The dispersion value is sufficiently high that 4 PM under the operating conditions is insignificant. Spurious lines are due to dispersion and SPM. The opening is ~0.414.

Figure 4:
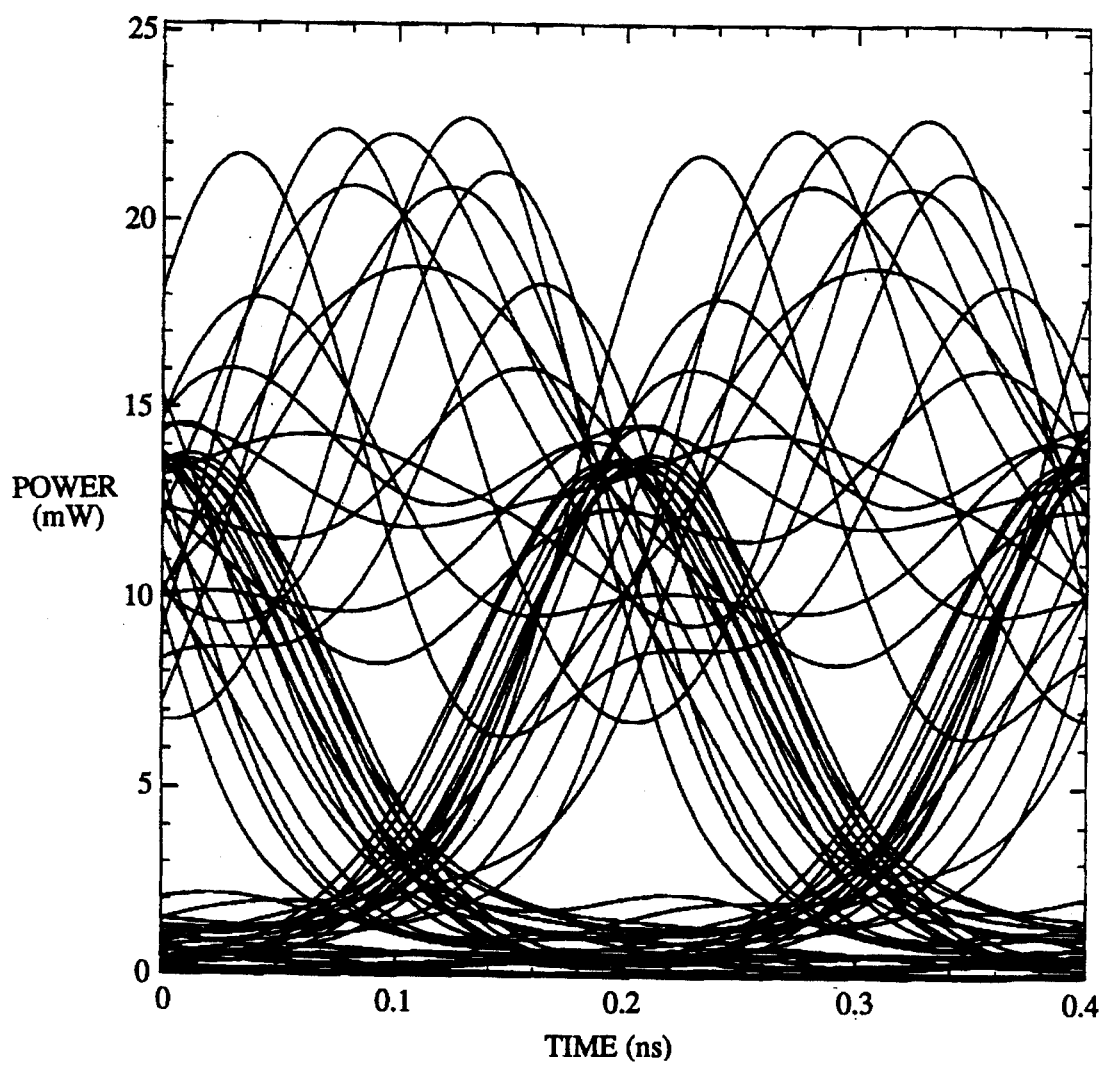
Figure 5:
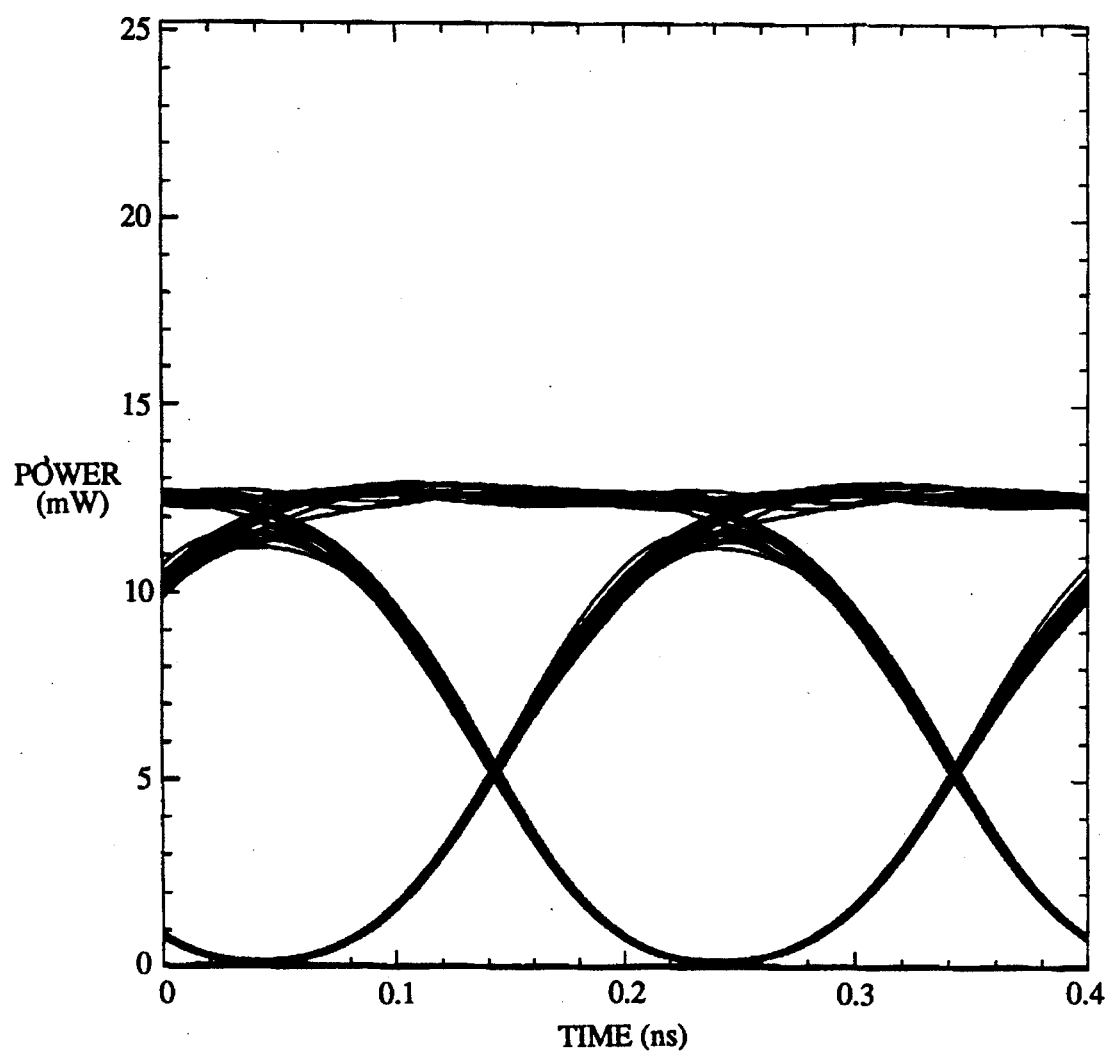

FIG. 5 plots all factors of FIG. 4 but with compensation to null the dispersion at each amplifier position (with 120 km inter-amplifier spacing). Compensation based solely on the (linear) dispersion, while ignoring SPM entirely, increases the eye opening to ~0.924. Based on this plot, there is no reason to expect that SPM need be taken into account, at least for compensation over the 120 km line lengths of the system, under the recited operating conditions.

SPM induced closure is a non-linear effect. Compensating over a greater length, e.g. by placement of compensation fiber only at termini of the span, increases closure more than 3-fold due to this effect. The diagram suggests that even this would be of little consequence. Preference for fiber of lesser dispersion—e.g. $\leq 8$ ps/nm-km—is expected to be of concern only for systems of substantially greater compensation-to-compensation distances or of significantly greater capacity.

I. The Transmission Line

A) WDM fiber

DS fiber requires neither concatenation nor compensation and it is largely for this reason that it has been favored over the other approaches. The WDM fiber of co-filed U.S. Pat. No. 5,327,516, issued Jul. 5, 1994, is expected to replace DS fiber for near-term systems that are intolerant of dispersion nulling. This fiber, with chromatic dispersion within its permitted range of 1.5–4 ps/nm-km, will likely be used for four-channel, 360 km span lengths, 20 gbit/sec systems. Future systems, of much higher capacity/span length, may use WDM fiber lines which are compensated to further reduce linear dispersion. For reasons described in the co-filed application, the sign of the dispersion required for WDM fiber, is preferably positive (+1.5–4 ps/nm-km). Compensating fiber would accordingly be of negative dispersion. As noted in the co-filed application, implications of the inventive teaching go beyond the dispersion range noted. Specification of this range is appropriate on balance for contemplated systems. Use of lesser dispersion—to 1.0 ps/nm-km and smaller—continues to ensure improved capacity over use of DSF, although somewhat reduced as compared with the specified range.

While WDMF, as noted, may be used without equalization while satisfying many system requirements, equalization may further increase capacity. In addition to possible equalization by use of compensation fiber, a specific form of concatenation is appealing. Here, concatenation would entail WDMF lengths of opposite sign of dispersion—both lengths within the preferred dispersion range of 1.5–4 ps/nm-km.

A trial specification table for WDM fiber suitable for use in a near-term system is set forth:

| WDM Specification Table | |
|---|---|
| Attenuation attenuation at 1550 nm | 0.22–0.25 dB/km |
| Attenuation at 1310 nm | 0.45–0.50 dB/km |
| Mode field diameter | 8.4 ± 0.6 micron |
| Core eccentricity | Less than or equal to 0.8 micron |
| Cladding diameter | 125 ± 2.0 micron |
| Cut-off wavelength | <1.30 micron, (2m reference length) |
| Dispersion | ≧+2 ps/nm-km @ 1550 nm |
| Dispersion slope | <0.095 ps/nm$^2$-km maximum |
| Macrobending | <0.5 dB @ 1550 nm one turn, 32 mm |
| | <0.1 dB @ 1550 nm 100 turns, 75 mm |
| Coating diameter | 250 ± 15 micron |
| Proof test | 50 kpsi minimum (high proof test levels available upon request) |
| Reel length | 2.2, 4.4, 6.4, 8.8, 10.8, 12.6 and 19.2 km |

Design considerations are with a view to the small but critical dispersion which is the primary differentiation over DSF. Other design criteria regarding, inter alia, macrobending loss, mode field diameter, etc., are generally consistent with design of state-of-the an fiber (e.g. DSF) and may change as advances are made. *AT&T Technical Journal*, vol. 65, Issue 5, (1986) at pp. 105–121 is representative. Fiber is silica based, and includes a germania-doped core, together with one or more cladding layers which may be of silica or may be down doped with fluorine. The overall 125 µm structure has a core of a diameter of about 6 µm. The index peak has a Δn 0.013–0.015 with reference to undoped silica. Usual profile is triangular or trapezoidal, possibly above a 20 µm platform of Δn≅0.002. The WDM fiber specified may be compensated by a spool of compensating fiber. Compensating fiber of co-pending U.S. patent application Ser. No. 07/978,002, filed Nov. 18, 1993, is suitable for this purpose. Illustrative structures have a dispersion of 2 ps/nm-km.

B) Compensation

The principle has been described. It is likely to take the form of a major length of fiber of positive sign of dispersion, followed by compensating fiber of negative dispersion. As with WDM fiber, compensating fiber may be of the form described in the co-pending U.S. patent application.

Self-Phase Modulation, a non-linear effect resulting in random generation of different wavelengths, is found to be small. From FIGS. 4 and 5, it is concluded that compensation for (linear) dispersion at appropriate distances (in that instance at 120 km spaced amplifier positions) effectively eliminates SPM as a consideration. Under these circumstances, fiber with λ$_0$=1310 nm is acceptable (disregarding cost and inconvenience of compensation). The near-term WDM system on which description is based (360 km span length, four-channel, 5 gbit/channel) does accept the ~17 ps/nm-km uncorrected material dispersion of λ$_0$=1310 nm fiber. Future systems of longer spans or of greater capacity may use fiber of ~8 ps/nm-km dispersion.

Consideration of SPM leads to compensation several times along each span length. Requirements for the near-term WDM system are met by compensation of the ~17 ps/nm-km fiber at each amplifier (e.g. at spacings of 120 km). The inventive advance is useful for systems of shorter span length as discussed. Equalization (by compensation or concatenation) should not be at such short lengths as to act as an overall DS fiber. Equalization at distances of 1 km is precluded for this reason. Lengths of less than 20 km are best avoided. Practical system design, providing for tens of kilometers (e.g. 50 km or greater) of unequalized fiber for economic reasons, is suitable.

C) Concatenation

Considerations on system performance are quite similar to those for compensation. Concatenation over fiber lengths much shorter than about 20 km result in line behavior approaching that of DS fiber. Again, expedient design, with unequalized lengths of tens of kilometers is appropriate. SPM, an additional possibly limiting non-linear effect, can be tolerated for contemplated 20 gbit four-channel systems. Planned upgrading as well as higher capacity new installations may set a preferred maximum dispersion at ~8 ps/nm-km.

As with compensation, concatenation offers complete elimination of average dispersion. WDM systems presently planned may not require such precision. It is sufficient to reduce dispersion to that of the WDM Fiber specification table set forth (≧2.0 ps/nm-km).

It is not expected that concatenation will play a major role in near term terrestrial systems. It is more likely in undersea systems.

D) Other Considerations

Span length has been discussed in terms of a contemplated system. There, provision is made for spans as great as 360 km. It is likely such a system will contain shorter span lengths as well. This consideration may be described in broader terms. The basic approach is useful for all WDM systems, if only in permitting design freedom and relaxing design tolerances. A 5 gbit/sec, four-channel system gains significantly from the present teaching for span lengths of approximately 200 km. The relationship between capacity and span length is defined by:

$$B^2L \leq 104000/D \qquad (Eq. 1)$$

where:

B=bit rate in gbit/sec

L=length in km

D=average dispersion in ps/nm-km

Since length varies as the square of the bit rate, the corresponding span length for a 10 gbit/sec line capacity is 50 km. In general terms, then, systems based on the inventive teaching, include at least one fiber span in accordance with Eq. 1.

II. The Transmitter

This element as well as the receiver and optical amplifier are described in detail in "Fiber Laser Sources and Amplifiers IV", *SPIE*, vol. 1789, pp. 260–266 (1992). The transmitter consists of a laser for each channel. Laser outputs are separately modulated and modulated signals are multiplexed to be fed into the transmission line.

III. The Receiver

This element, at the end of a span length, may be at the system terminus or may be part of a signal regenerator. It includes a means for demultiplexing the channels. This requires a device which passes the channel wavelength of interest while blocking the others. This may be a simple splitter combined with optical fibers at the output ports tuned to each channel (SPIE ref, cited in preceding paragraph) or may be a device which combines the functions of splitting and filtering in a single unit.

IV. Optical Amplifier

This element, today, is an erbium amplifier. The useful gain region of a single erbium amplifier is λ=40–50 nm. When amplifiers are connected in a series, the net gain narrows (since the amplitude within the "gain region" is reduced on either side of the peak). The 10–20 nm bandwidth referred to is a reasonable value for a three-amplifier span.

V. Other Considerations

For the most part, other considerations are standard. With few exceptions, WDM systems designed for use with DS Fiber may be directly used for the invention. System design is in accordance with considerations common to the prior art and the invention. Channel spacing is necessarily such as to fit the channels within the peak of the optical amplifier. Span length maxima are set by insertion loss, launch power, and tolerable pulse spreading. Considerations may be tailored naturally in accordance with constraints imposed. For example, use of WDM fiber without compensation sets a limit on the product of bit rate and span length. Span length may be set by convenience, e.g. where compensation is to be provided, or where a concatenated fiber length is to begin.

Planned WDM systems use external modulation to lessen dispersion penalty and to improve the spectral stability of the channels.

What is claimed is:

1. Wavelength division multiplexed optical waveguide system including:

a transmitter for generating, modulating, and multiplexing modulated channel carriers for introduction into a transmission line, the transmitter being characterized by a "system wavelength" of magnitude within the wavelength range of the grouped channel carriers; a receiver for performing functions including de-multiplexing modulated channel carriers; optical amplifiers; and a transmission line of optical fiber including at least one fiber span defined at one end by a transmitter and at the other end by a receiver, in which the span includes at least one optical amplifier

CHARACTERIZED IN THAT substantially all fiber defining the span has a chromatic dispersion of an absolute value in the range 1.5–4 ps/nm-km at the system wavelength.

2. System of claim 1 in which the system wavelength is approximately 1550 nm.

3. System of claim 2 in which substantially all fiber defining the span is of substantially uniform chromatic dispersion.

4. System of claim 3 in which the chromatic dispersion is $\geq 2$ ps/nm-km.

5. System of claim 2 in which average linear dispersion of fiber defining the span is equalized to a magnitude of approximately zero by inclusion of at least two lengths of fiber of different signs of dispersion.

6. System of claim 5 in which substantially all fiber defining the span is of uniform chromatic dispersion $\geq 2$ ps/nm-km, and in which equalization is due to inclusion of compensating fiber.

7. System of claim 2 in which optical amplifiers are composed of erbium-doped silica.

8. System of claim 7 in which extreme wavelengths of channels define a spectrum $\leq 20$ nm.

9. System in accordance with claim 8 using at least four channels which are spaced by 0.8–4 nm.

10. System of claim 1 in which a substantial length of fiber within a span has a $\lambda_0 \cong 1550$ nm.

* * * * *